Feb. 4, 1936.  N. ARFSTEN  2,029,300

METHOD AND APPARATUS FOR PRODUCING STEREOSCOPIC EFFECTS

Filed Nov. 1, 1932  6 Sheets-Sheet 1

INVENTOR.
Newton Arfsten

BY
ATTORNEY.

Feb. 4, 1936.　　　　N. ARFSTEN　　　　2,029,300
METHOD AND APPARATUS FOR PRODUCING STEREOSCOPIC EFFECTS
Filed Nov. 1, 1932　　　6 Sheets-Sheet 2

INVENTOR.
Newton Arfsten
BY
*Joseph Hirschman*
ATTORNEY.

Feb. 4, 1936.                    N. ARFSTEN                       2,029,300
              METHOD AND APPARATUS FOR PRODUCING STEREOSCOPIC EFFECTS
                    Filed Nov. 1, 1932              6 Sheets-Sheet 3

INVENTOR.
Newton Arfsten
BY
*Joseph Hirschman*
ATTORNEY.

Feb. 4, 1936.   N. ARFSTEN   2,029,300
METHOD AND APPARATUS FOR PRODUCING STEREOSCOPIC EFFECTS
Filed Nov. 1, 1932   6 Sheets-Sheet 4

INVENTOR.
Newton Arfsten
BY
ATTORNEY.

Feb. 4, 1936.   N. ARFSTEN   2,029,300
METHOD AND APPARATUS FOR PRODUCING STEREOSCOPIC EFFECTS
Filed Nov. 1, 1932   6 Sheets-Sheet 5

INVENTOR.
Newton Arfsten
BY
ATTORNEY.

INVENTOR.
Newton Arfsten
BY Joseph Hirschman
ATTORNEY.

Patented Feb. 4, 1936

2,029,300

UNITED STATES PATENT OFFICE 2,029,300

METHOD AND APPARATUS FOR PRODUCING STEREOSCOPIC EFFECTS

Newton Arfsten, New York, N. Y., assignor of one-fifth to Karl Pohl and one-half to P. William Buchhart, both of New York, N. Y., and one-fifth to Franz Borchmann, Little Neck, Long Island, N. Y.

Application November 1, 1932, Serial No. 640,589
In Germany December 12, 1931

18 Claims. (Cl. 88—16.6)

The present invention relates to an improved method and apparatus for producing moving and stationary stereoscopic effects, and has for its primary object to provide a method of photography and projection for stereoscopic pictures employing ordinary cameras and projectors and characterized by apparatus which is simple and inexpensive in construction and reliable in operation.

Various devices, namely, stationary pictures, are already known which produce the illusion of three dimensions upon an observer. These pictures consist of the actual picture plate with a screen made of opaque strips arranged close to such plate, such strips exposing vertical slits therebetween. The strips may also consist of vertically arranged cylindrical lenses. The picture upon the plate, which may be a photograph or light-projected picture of a landscape etc. is decomposed into bands corresponding to the slits of the screen. Besides these bands of one picture there are present also bands of another picture which show the same landscape but viewed from a point lying to the right or to the left of the point from which the first-mentioned picture was photographed; in addition to the first and second sets of bands there are present also bands of a third, fourth, etc. picture viewed or photographed from points located correspondingly further to the right or left of the above-mentioned point. On viewing the picture, the left and right eyes of the observer look through the slits or cylindrical lenses of the screen upon those band-like sections of the partial pictures which the brain unconsciously recognizes as belonging together. As these fused partial pictures, that is, the left and right picture viewed by the respective eyes, lie behind slits which can have various distances from each other, the lines of sight or optical axes of the observer cross each other in varying degrees. As an object appears to the observer to be located where the optical axes cross each other, the result is obtained that the observer receives the illusion of depth and hence a three dimensional impression of the picture.

Methods and devices are also known which have in view the application of the above-described principle to moving pictures. The object of the present invention is to provide an improved method and apparatus for producing stereoscopic or three-dimensional pictures and particularly motion pictures, in a simple and effective manner with the use of an ordinary film projector and with films made with an ordinary motion picture camera. It is also an object of the invention to provide an improved method and apparatus for stereoscopic projection wherein the unavoidable flickering of the film in the projector or upon the projection screen does not disturb the production of a three-dimensional impression upon the observer.

The present invention may also be utilized to photograph stationary stereoscopic pictures, as will be described below.

Several embodiments of the invention are illustrated by way of example on the accompanying drawings, wherein.

Figures 1, 2, 3:
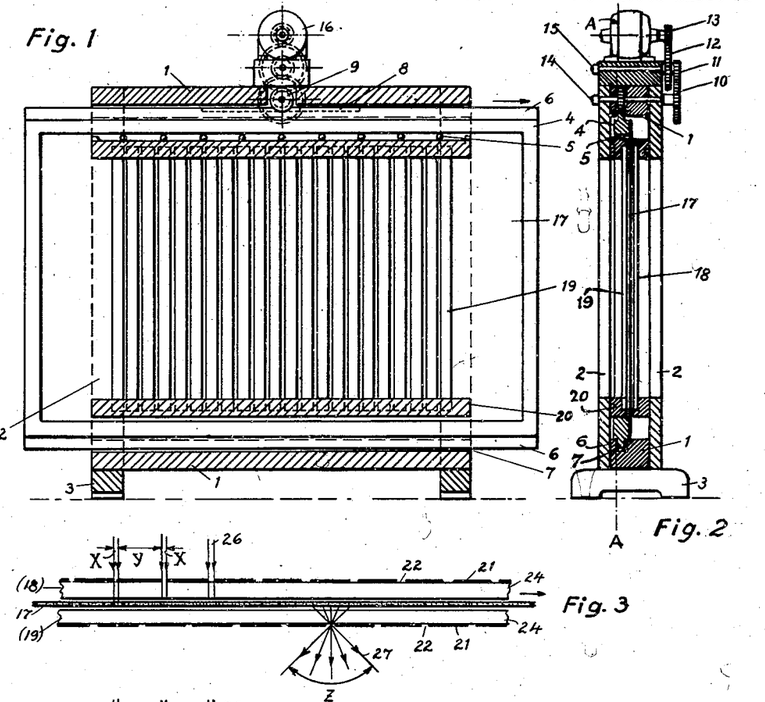
Fig. 1 shows a front view of a projecting screen employed in carrying out the present invention, the view being along the line A—A of Fig. 2.
Fig. 2 is a transverse section through the projector screen.
Fig. 3 is a horizontal section through the screen and grid, the latter consisting of spaced opaque strips or bands.
Figure 3A:
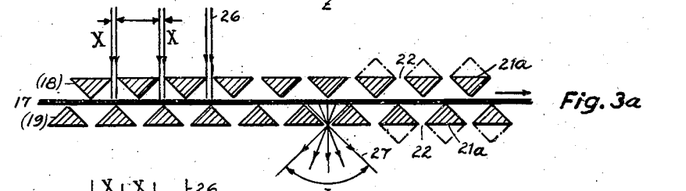
Fig. 3a is a view similar to Fig. 3 showing a grid consisting of spaced rods.
Figure 4:
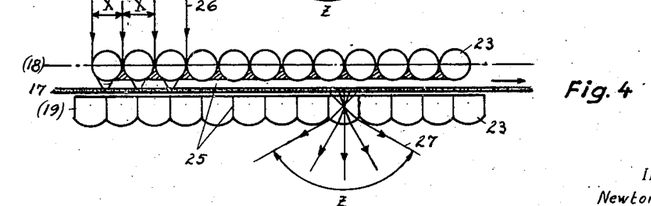
Fig. 4 illustrates a similar section through a screen and grid wherein the latter is built up of lenses.

Referring to Figs. 1 and 2, the mechanism includes a support of wood or metal and composed of two horizontal bars or beams 1 and four vertical columns 2 resting upon feet 3. Upon this support is slidably mounted a frame 4 which rests upon ball-bearings 5 to reduce the friction. Tongues 6 which run in grooves 7 in the beams 1 guide the longitudinal movements of the frame 4. The upper tongue 6 is provided with teeth 8 with which meshes a gear 9 driven by a motor 16 through gears 10, 11, 12 and 13 mounted upon shafts 14 and 15 and the armature shaft of the motor, and arranged to move the frame 4 in or opposite to the direction of the arrow in Fig. 1. A projection screen 17 is stretched or supported upon or within the frame 4, such screen being composed of transparent material, such as regenerated cellulose, pyroxylin plastics, glass, synthetic resins, or other suitable material, and is provided with a coating of luminous material. This luminous coating, whose properties will be described more in detail below, covers either the rear or front side of the screen 17; in order to protect the coating against mechanical injury, and against moisture, it may be positioned between two layers of regenerated cellulose, glass etc. Close behind and in advance of the screen 17 are positioned grids 18 and 19 which are fixed to the bars 20. The grids are composed of vertical opaque stripes 21 or bars or rods 21a between which are open slits 22 (Figs. 3, 3a). The grids may also be composed of transparent convex lenses 23, as shown in Fig. 4. The stripes 21 may be formed either by applying an opaque coating upon a transparent plate 24 made of regenerated cellulose, glass etc. or by being photographed thereon (see Fig. 3); while the rods 21a are of opaque material, such as metal, having a non-reflecting surface. The cross-section of the rods may be triangular or quadrangular or of any other suitable form; the edges which bound the slits 22 should, however, be as sharp as possible.

The cylindrical lenses 23, which are made of transparent material, such as glass, resin, regenerated cellulose etc., may have a round or other cross-section (Fig. 4), and they may be either arranged loosely beside each other in a row or they may be connected together by means of an opaque cementing material 25 into a continuous plate. The faces along which the lenses engage each other or at which they are connected are roughened to make them non-reflecting.

Where mention is made hereinbelow of the projection screen or of the screen, such term is to be understood as including the whole screen with grids etc., while the actual screen itself, which is provided with the luminous or phosphorescent coating, will be designated as "luminator" or phosphorescent screen.

If, as will shortly be described, light rays 26 are thrown upon the projection screen suitably located in a darkened theater, then only the rays $x$ which pass through slits 22 will strike the luminator 17, while the remaining rays $y$, which strike the stripes 21 or rods 21a of the grid, are absorbed by the latter. The greater the width $y$ of the stripes 21 or rods 21a in relation to the width $x$ of the slits 22, the greater is the absorption of the rays 26. When a grid composed of cylindrical lenses 23 is employed, not much light is absorbed, because the light-absorbing areas, which are confined to the places at which the lenses abut against each other, are comparatively small. The cylindrical lenses of the screen 18 break the incident light rays in such manner that the luminator is struck by narrow but very bright bands of light. If the same degree of brightness were to be obtained with the grids composed of the opaque elements 21, 21a, then the rays 26 would have to be brighter the wider such elements are in relation to the slits 22. The light rays $x$ falling upon the luminator 17 excite the coating at the places that are impinged. These places define vertical bands and will be referred to hereinafter as "luminous bands." The coating on the luminator is of such character that these bands remain luminous after the light rays 26 have been cut off. If now the luminator 17 is moved in the direction of the arrow, Fig. 1, by the motor 16, and new rays 26 strike the luminator as soon as the previous luminous bands have been moved into the dark spaces behind the elements 21, 21a, or at the edges of or between the lenses 23 of the grid 18 of Fig. 4, then the whole luminator 17 is gradually covered with a series of juxtaposed luminous bands. These bands are visible through the grid 19 from many directions 27 within the angle $z$ at each slit 22 or at each cylindrical lens 23 of the grid 18 of Fig. 4.

Figure 5:
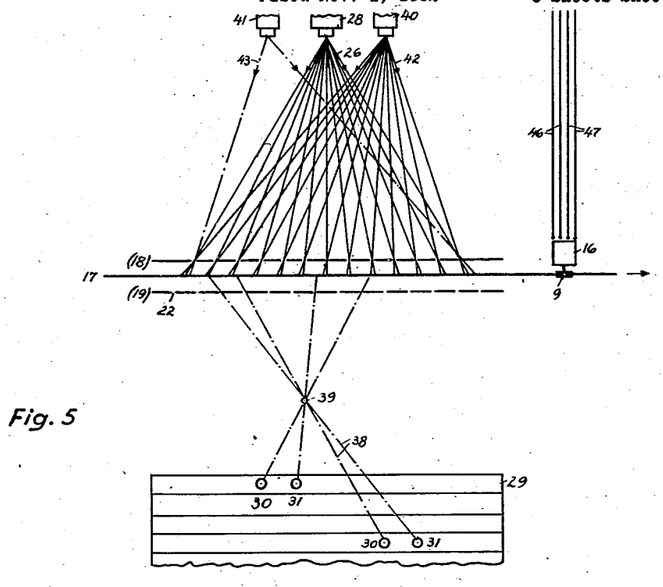
Fig. 5 shows diagrammatically a theater viewed from above in which a screen is employed which is provided with grids composed of rods.
Figure 6:
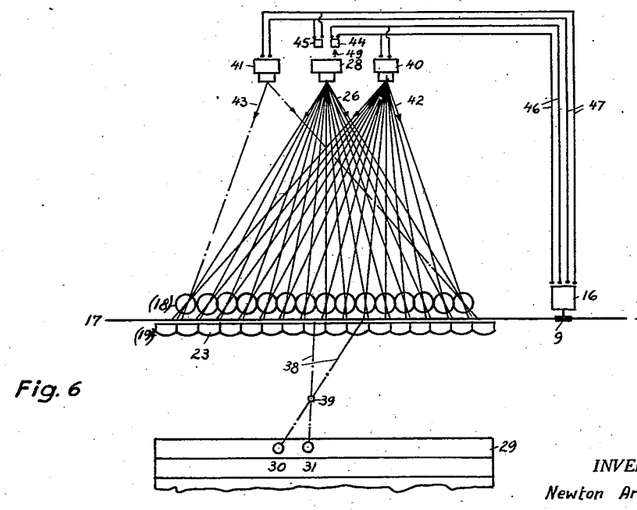
Fig. 6 is a view similar to Fig. 5 in which the grids are composed of lenses.

The projection of the light rays 26 is accomplished with the aid of an ordinary film projector 28 (Figs. 5 and 6). The projector 28 is located behind the projection screen as viewed from the show-room 29. The light rays 26 thus pass through the rear grid 18, which in the description following will be designated as the distributor, and fall upon the luminator 17 which is viewed through the front grid 19 by the left and right eyes 30 and 31 of the observer. By the use of a distributor made of cylindrical lenses (Fig. 6) the luminator 17, as mentioned above, will be brighter than with the use of a light-absorbing distributor (Fig. 5). If in the latter case the luminator 17 is to have a greater brightness, then the light source of the projector 28 must be correspondingly brighter, which, however, in view of the inflammability of most films, is not desirable.

Figures 31, 31A, 31B:
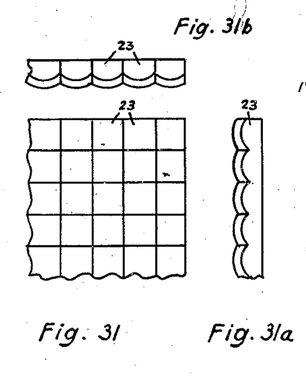
Fig. 31 is a plan view of a lens component for a front grid of modified form having its front surface composed of a multiplicity of small convex or semi-spherical lens elements.
Fig. 31a is a view in side elevation of the lens structure shown in Fig. 31.
Fig. 31b is a view similar to Fig. 31a, but looking toward the upper edge of the structure.

The luminator will be seen in greater brightness if a front grid consisting of cylindrical lenses is employed. A front grid consisting of slits has the advantage that spectators looking through it under any angle in the vertical and horizontal planes will always see the luminous bands undistorted, whereas when using a front grid with cylindrical lenses only the spectators whose lines of sight are in planes passing through the objective of the projector and any horizontal line of the screen will not be much disturbed by distortions. If the same advantage is desired as is obtained with a front grid consisting of slits, each vertical cylindrical lens must be composed of small spherical lenses as shown in Figs. 31, 31a and 31b.

Figure 7:
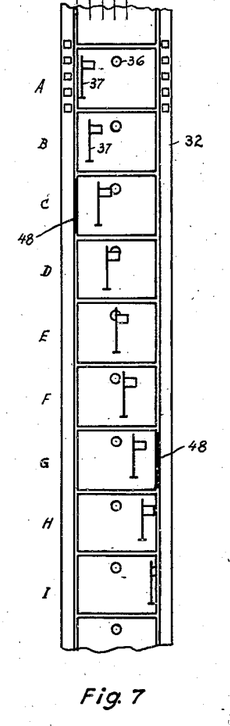
Fig. 7 shows a piece of film with the aid of which the principles underlying the invention will be explained.
Figure 8:
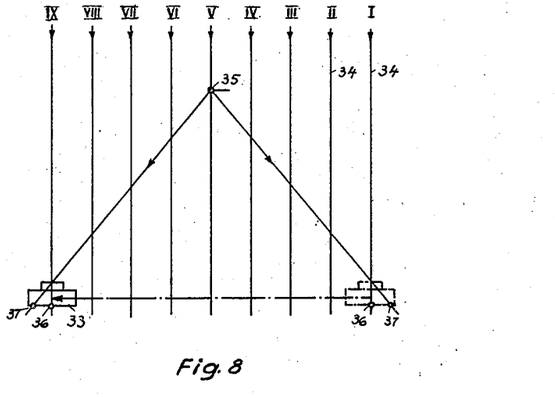
Fig. 8 shows schematically the manner in which the film is exposed when a scene is photographed.

The film strip 32 (Fig. 7) is photographed in the following manner: As a scene is photographed, the camera 33 is moved laterally of the scene and must continue to be moved at uniform velocity (Fig. 8). Any suitable device may be employed to accomplish such movement and it is not necessary to describe any particular one in detail. If the camera 33 is directed upon a very distant object, such as the sun, whose rays are represented by the lines 34, and if a closer object 35, such as a flag pole, is located in the field of the camera, and if exposures are made successively at the places I–IX by the camera 33 as it moves in the direction of the arrow, there are obtained the pictures A to I (Fig. 7). The images of the very distantly removed object (the sun) are positioned always at the same place on the pictures A—I, namely at the middle of the pictures (when the movement of the camera is purely rectilinear), because the camera 33 was directed upon such object during the exposures. The images 37 of the closer object 35, on the other hand, are positioned upon the films A—I upon a series of progressively changing locations, each location being displaced somewhat to the right or to the left with reference to the previous location on the preceding picture.

Figure 9:
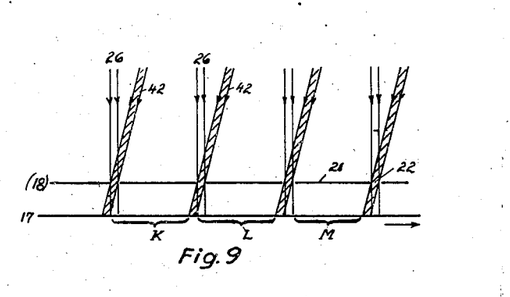
Fig. 9 illustrates the path of the rays of light through the grid to the screen.
Figure 10:
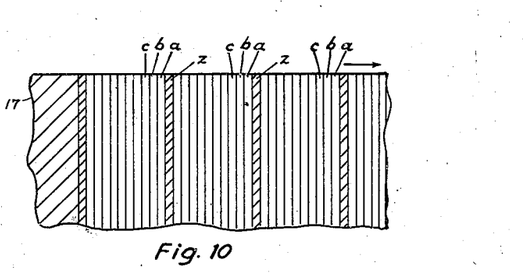
Fig. 10 is a view representing the screen after the light rays from the projector have acted thereon.

If these pictures on the film strip 32 are projected upon the luminator 17 by the projector 28 (Figs. 5 and 6) through the distributor 18 while the luminator is moved in the direction of the arrow by the motor 16, there are produced upon the luminator the fields K, L, M, etc. with adjacent light bands a, b, c, etc. (Figs. 9 and 10). The number of fields is just as large as that of the slits or lenses in the distributor 18; and the number of bands of light upon the fields is greater the smaller the width of the slits or the width of a light band produced by a lens in relation to the width of the stripe or bar 21, 21a, or of the lens 23 of the distributor 18. As can readily be seen, the light bands a in each of the fields K, L, M, etc. belong to the just projected picture A (Fig. 7) while the light bands b belong to the next picture B etc.; further, the light bands a, b, c, etc., of the first field K arise from a band k (Fig. 7), at the left margin of the pictures A, B, C, etc., those of the second field L arise from a series of bands l which lie next to the bands k in said pictures, etc.

After several picture projections, the luminator 17 (Figs. 9 and 10) has moved laterally for such a distance that the first luminous band a comes into registry with the next slit 22 of the distributor 18. At this instant the luminous coating must have lost its luminosity at such bands, so that the bands again become dark and are again rendered luminous only upon illumination by new beams 26.

This extinguishment of the luminosity of the luminous film can be accomplished by artificial means, for example, by radiating the screen locally by means of infra-red light. To this end there are located radiators, 40, 41, (Figs. 5 and 6) laterally of the projector 28, such radiators throwing their beams 42—43 through the distributor 18 upon the luminator. If the luminator 17 moves in the direction of the arrow, in Figs. 5 and 6, then the beams 42 of the radiator 40 fall upon the luminator 17 in such a manner that the latter is struck at the places z (Figs. 9 and 10) which shortly thereafter are illuminated by new beams 26. As the rays 42 extinguish the luminosity of the luminator 17 along the bands Z struck thereby, but do not in any way impair the luminous character of the coating on the luminator, the latter is dark at the places impinged by the new rays 26.

If the luminator moves opposite to the direction of the arrow, the radiator 40 is cut out and the radiator 41 set into operation, the latter then throwing the extinguishing rays 43 upon the luminator. The cutting in and out of the radiators 40, 41, as well as the reversal of the motor 15 which moves the luminator, may be accomplished automatically by means of photoelectric cells 44—45 which are connected by conductors 46, 46 through suitable amplifiers, with the radiators and with the motor. As such control devices are known, they need not be described in detail.

The excitation of the cells 44, 45 occurs with the aid of light rays 49 from the source of light of the projector 28 or from any other suitable source. These rays 49 must, however, first penetrate the ordinarily opaque edge of the pictures of the film strip 32 (Fig. 7). To this end there are provided transparent areas 48 at the left or right margin of such strip. When such an area 48 passes one of the cells 44, 45, a beam of light falls upon such cell which then effects the reversal of motor 16 or of the radiators 40, 41. For example, a light beam 49 (Fig. 6) passing through the transparent area 48 in the right margin of the film strip 32 may excite the right cell 44. Such devices also are known and a more detailed description thereof is therefore not necessary. The transparent areas 48, 48 which control the activity of the cells 44, 45 may lie also at other places, for example, at the transition point from one scene to another upon the film strip, and in place of transparent areas there may be provided apertures in the film strip through which contacts may pass which close the circuit of the conductors 46 or 47.

As the luminous coating of the luminator is the brightest at the place where the bright rays strike it but is less brilliant or even dark where the less bright rays or no rays at all strike it, and further, the difference in brightness of the rays is determined by the difference in brightness of the different portions of the pictures on the film in the projector, the projector of the film produces the result that there is reproduced upon the luminator a picture having the same properties as the picture on the picture plate mentioned in the introduction to this specification.

If the observer in the theatre 29 (Figs. 5 and 6) views the luminator 17 through the slits 22 or lenses 23 of the grid 19, then the left eye 30 sees different luminous strips from those seen by the right eye 31. The luminous bands viewed simultaneously by both eyes are merged in the brain due to the identifying capacity of both eyes, that is the property of the eyes that, when one eye is directed upon an object, the other eye unconsciously directs itself to the same object and identifies it as the same object. The luminous bands viewed by the left and right eyes thus represent views which are known as right and left images. Right and left images of very distant objects (such as the sun) coincide upon the luminator 17. If the left image lies upon the luminator to the right of the associated right image, then the lines of sight 38 intersect each other. As an object appears to the observer to lie in the place where the lines of sight intersect, the observer sees a distant object in the plane of the screen, while closer objects, such as the flag pole 39, appear to lie in advance of the screen. The further the associated partial images are separated upon the screen, the nearer the object appears to move toward the observer. If the left image lies further than the distance of the eyes to the left of the right image upon the luminator, a pseudo-stereoscopic effect is obtained, that is, far removed objects appear to be close to the observer while nearer objects are at a distance. In such case, the film strip in the projector is to be turned around or the direction of movement of the luminator is to be reversed.

The method of film projection above-described thus produces a three-dimensional or stereoscopic impression upon the observer. The photographing of "dead scenes" (e. g. landscapes, in which the objects do not move) is reproduced without distortion by the process just described, with the exception of a shortening of the distances when very distantly removed and very close objects are simultaneously to be reproduced; for the very distant objects always lie in the plane of the luminous screen. This limitation may, however, be overcome by employing suitable methods in photographing the scenes.

With animated scenes, that is, in scenes wherein the various objects move with reference to each other, distortions occur which become greater with increase in the movement of the objects or decrease in the number of pictures taken per second. Also in such cases, the distortions can be overcome by employing suitable methods of photography.

Figures 11, 16:
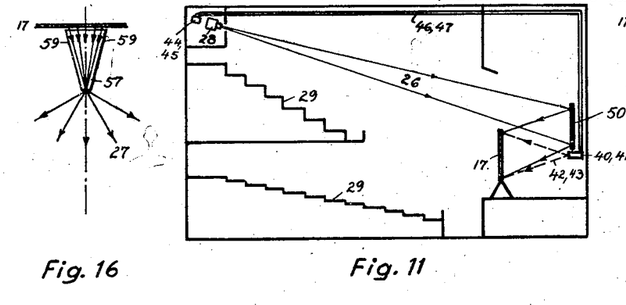
Fig. 11 is a schematic side view of a theater equipped with apparatus according to the invention.
Fig. 16 shows the path of the light rays through another element of the grid shown in Fig. 12.

As in most theatres the projector 28 is located to the rear of the theatre 29, (Fig. 11), there can be arranged to the rear upon the stage, a mirror 50 which throws the light ray 26 in the described manner upon the screen 17 from behind. This mirror may also be arranged at other places, for example, laterally of the screen, and throw the rays from the right or from the left in front upon the screen. The radiators 40—41 can be located in the space behind the screen.

Figure 15:
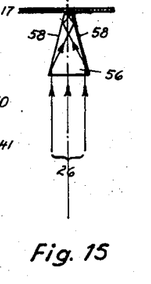
Fig. 15 shows the path of the light rays through an element of the grid shown in Fig. 12.

A somewhat different arrangement, in which the projector is positioned to the rear of the theatre, is the following: In front of the screen 17 (Fig. 12) which is here in the form of an endless band and is moved laterally by rollers 52 which are driven in the known manner by motor 16 through bevel gears 53, 54 there is located a fixed frame 55 in which vertical transparent rods 56, 57 are fixed. These rods, which may be made of glass, regenerated cellulose, resin, etc., and may be of trapezoidal or other cross-section, have two different light transmitting properties. The rods 56 which alternate with the rods 57 serve as a distributor, that is, they catch the rays 26 coming from the projector and refract or reflect them in such a manner that the above described narrow light bands are thrown upon the luminator 17. In order to obtain a better utilization of the light, the lateral surfaces 58 (Fig. 15) can be made reflecting by means of a coating of nickel, silver, etc. As according to the law of Stokes a luminous coating usually sends out longer light waves than it receives, the rays 26 can be of small wave length, for example, ultra-violet light; the rods 26 must be made of a material (quartz, certain types of glass, etc.) which transmits these rays. These short-wave rays excite the luminous coating upon the luminator and bring it to luminescence so that it sends out longer waves, i. e., visible rays. The visible luminous bands are viewed in the above-described manner by the eyes 30, 31 of the observer through the rods 57 (Figs. 12 and 16) which are transparent to these rays. If in addition the rods 56 are colored with a coloring material which is transparent to these rays 56, the rods 57 being however made of a material which does not transmit ultra-violet rays, such as ordinary glass or certain kinds of regenerated cellulose, then on the one hand the illumination of the bands upon the luminator cannot be seen at the instant of its excitation produced by the rays 26, and on the other hand the rays 26 falling upon the rods 57 cannot penetrate the material of these rods which is opaque to such rays, and the areas of the illuminated bands upon the luminator 17 which have remained dark therefore do not luminesce. However, visible light can without difficulty be employed for the rays 26 if the slits 22 between the rods 56 are kept small. By light roughening of the sides of the rods 56, 57 facing the observer any disturbing reflections of the rays 26 by the front side of such rods is prevented. It may also be mentioned that the lateral surfaces 59 of the rods 57 can be made non-reflecting by roughening and covering the same with a dark coat of paint.

In order to keep the rays 26 from the rods 57 when such rays are composed of visible light, there can be arranged a distributor 61 in the film window 60 (Fig. 13) of the projector. This distributor, which can be located a short distance in advance or a short distance to the rear of the film band 32, or at other places to be described below, consists of a series of juxtaposed vertical rods made of opaque material, such as metal. The width of the rods, the spaces between them and their number are of such magnitude that their projections by the rays 26 always cover the corresponding elements of the grid in front of the luminator 17. As the manufacture of this distributor, which may also be made of a plate of transparent material (glass) upon which the opaque areas are produced by grooving and filling with an opaque coating composition is too laborious because of its fineness, and as the arrangement of the same at the film window is not advisable because of the high heat prevailing at such place, the distributor can be arranged also externally of the actual projector mechanism.

In the ordinary projector the light rays 26 coming from a source of light 62 are thrown by a condenser 63 upon the film strip 32. The rays 26 penetrating through the transparent areas of the film strip are thrown by an objective 64 upon the grid 55 or upon the luminator 17 in such a manner that a real image of the film picture is produced upon such luminator.

Figures 12, 13, 14:
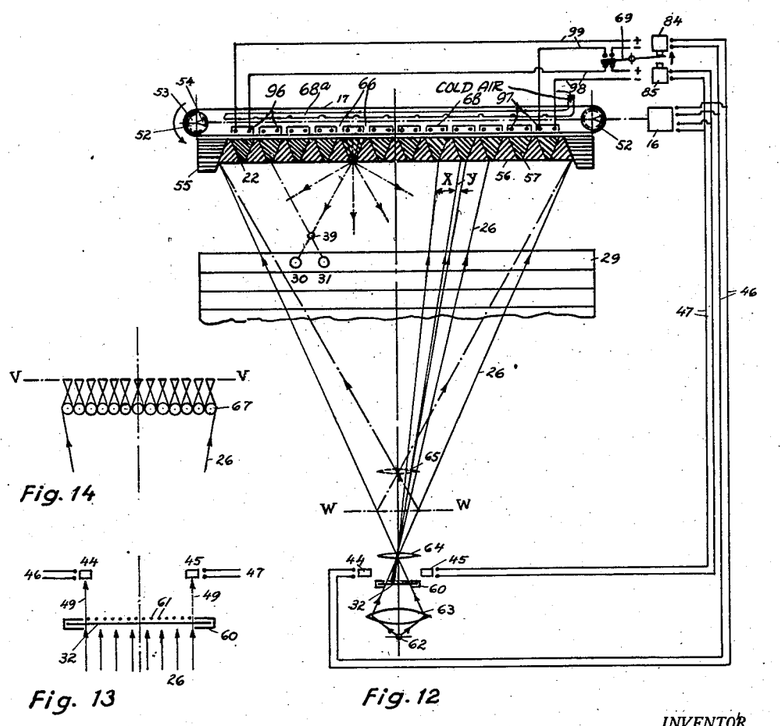
Fig. 12 illustrates diagrammatically a theater provided with my improved apparatus in which the grid consists of various kinds of vitreous or glassy material.
Fig. 13 shows diagrammatically a horizontal section through the window of a projector provided with a grid composed of strips or rods.
Fig. 14 shows on an enlarged scale a grid composed of lenses which is positioned at W—W in Fig. 12.

If the objective 64 is a strongly retracting lens, the real image is obtained in a plane W—W which may be located at any place between the projector and the projection screen. If the distributor 61 is positioned in this plane W—W, and if a further lens, the main objective 65, is arranged as shown in Fig. 12, then the same conditions are obtained as are described above. In the plane W—W the distributor 61 can be of larger size and is not so exposed to heat and can be more easily cooled. This cooling can be accomplished in known manner by means of a blast of air, or the rods of the distributor can be made hollow and a cooling liquid circulated therethrough.

In place of the opaque distributor a transparent one may be employed composed of juxtaposed cylindrical lenses 67 (Fig. 14). This distributor 67 is so arranged between the projector and the main objective 65 that the real image produced by the lenses 67 in the plane V—V lies in the plane W—W. In this case the real image projected by the main objective 65 falls upon the grid 55 in such manner that only the rods 56 receive light, assuming of course, that the number of lenses of the distributor 67 corresponds with the number of rods 56.

As every lens distorts the picture to be transmitted to a certain degree, care must be taken that the grid 55 and the distributor 61 or 67 correspond properly with one another. This correspondence is best obtained by photographing the grid 55 through the objective 65 or 64 upon a stencil or directly upon the plate from which the distributor is to be prepared or according to which the stencil is to be cut.

In the arrangements above-described, the grid 18 or 19 is stationary while only the luminator 17 is moved; my improved process may however also be carried out with apparatus in which both the luminator and grid move. A projection screen 70 (Fig. 17) made of an endless band of flexible and transparent material (cellulose) can be driven by motor 16 through vertical rollers 52 which in turn may be driven in known manner through bevel gears 53, 54, the screen being moved laterally in or against the direction of the arrow. The above-mentioned opaque stripes or bars 21, 21a, separated by the slits 22, are located upon the front side of the actual projection screen 71 (Fig. 22); the rear side is covered with a layer 72 of luminous material. As such coating is sensitive to pressure, there can be provided behind the same a layer 73 of a transparent or non-transparent flexible material (cellulose, linen, rubber) so that the coating 72 is subjected neither to tension nor to pressure as the screen turns around the rollers 52. This layer 73 protects the coating 72 also against mechanical injury and against damage by moisture. To the same end the forward side of the screen 71 may be provided with a transparent coating 74 of lacquer, cellulose derivative, etc.

Figures 17, 18, 20, 22:
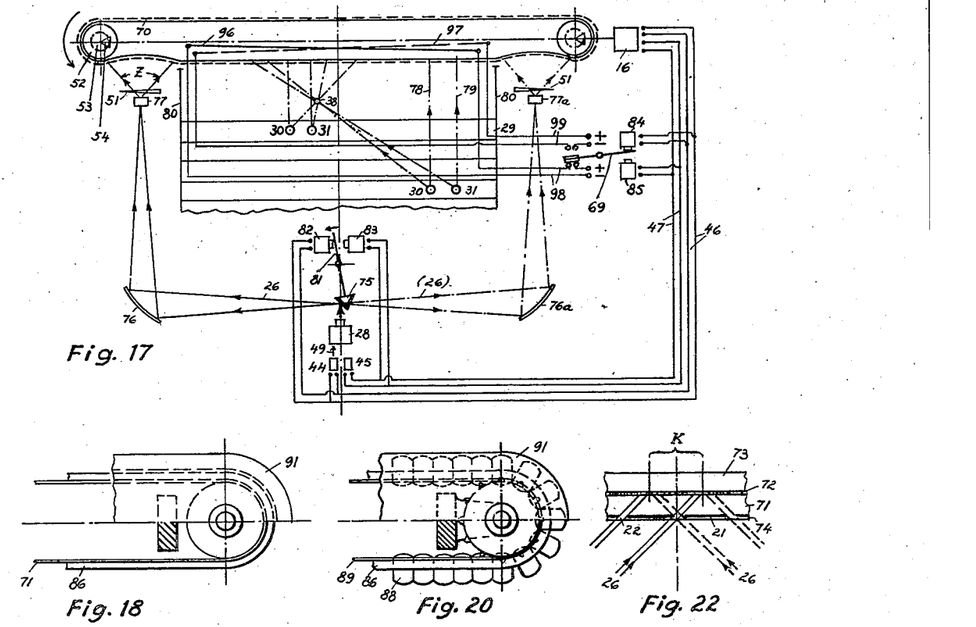
Fig. 17 is a diagrammatic view of a theater equipped with a screen of different construction from that above-described.
Fig. 18 shows a portion of such screen on an enlarged scale.
Fig. 20 is a view showing a portion of the screen shown in Fig. 17 when the same is made up of lenses.
Fig. 22 shows the path of light rays through the grid illustrated in Figs. 18 and 19.

The projector 28 located to the rear of the theatre 29 throws its picture-rays 26 upon an objective 77 by means of a mirror 75, 76. This objective sends the rays at a large angle Z through the slits 22 and upon the luminous coating 72, where at first a luminous band is produced behind every slit. It can easily be seen that the luminous band produced by the rays at the extreme left lies likewise at the extreme left upon the field behind the respective slit; the luminous band produced by the middle rays lies upon the middle of the respective field; while the luminous band produced by the rays at the extreme right lies at the extreme right of the respective field. If now the screen 70 moves constantly in the direction of the arrow and if the projector in the meantime projects constantly new pictures upon the screen, the individual fields behind the slits will finally be covered with the juxtaposed luminous bands. Upon further movement of the screen, these luminous bands will be visible from the theatre, and the eyes 30, 31 of the observer see the left and right images described above and gain the impression of three dimensions.

With the arrangement just described the depth of the picture is correctly reproduced. The images of a far removed object always lie at one and the same place upon the fields behind the slits; thus in the above-described film strip, the sun always lies in the middle of the fields. This middle of the fields can however be seen only by the eye which is perpendicularly in front of the same; the other eye, on the other hand, sees the middle of the field which is removed by the distance between the eyes from the first field. As a result, the two ocular axes 78, 79 run parallel and the observer consequently sees the sun lying at a distance. The scene projected upon the screen then moves slowly past the observer and creates the impression that he is sitting in a railway train and is looking out upon the passing landscape.

If the direction of motion of the screen is reversed then the scene moves past the observer in the other direction. In such case the rays of the projector 28 are thrown upon the right end of the screen by means of the adjustable mirror 75 and of another mirror 76a and objective 77a. The places upon the screen upon which the pictures are projected can be separated from the showroom 29 by walls 80 so that the light reflected from the front side of the screen exerts no disturbing effect. Before reversing the movement of the screen, the screen should move for some seconds in the previous direction so as to allow the "luminous bands" on the screen to become dark again. For this purpose a number of dark pictures can be projected before the new scene begins.

The reversal of the rotation of the motor 16 which moves the screen 71, and likewise the adjustment of the mirror 75, are accomplished in known manner by the photoelectric cells 44, 45. The conductors 46, 47 lead also to electromagnets 82, 83, which so adjust the mirror 75 which is fixed to a lever 81 that upon excitation of the cell 44, the mirror throws the rays 26 upon the objective 77, and upon excitation of the other cell 45 it throws the rays upon the objective 77a. The mechanisms for accomplishing these results are well known and therefore need not be described in detail.

Figures 19, 21, 24:
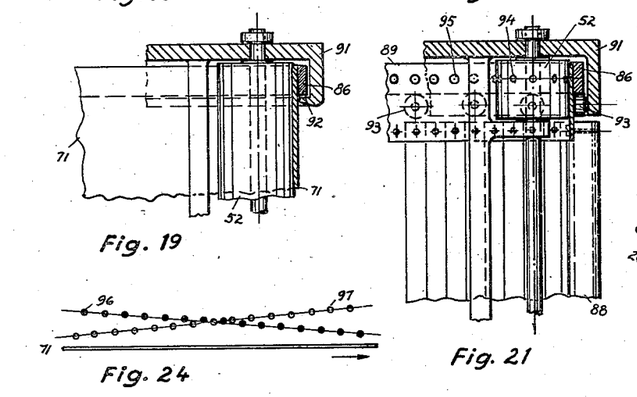
Fig. 19 is a front view, partly in section, of the apparatus shown in Fig. 18.
Fig. 21 shows a front view, partly in section, of the apparatus of Fig. 20.
Fig. 24 illustrates a heating element employed with the apparatus of Fig. 17.
Figure 23:
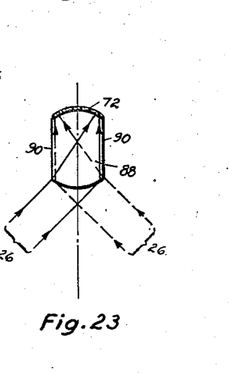
Fig. 23 shows the path of light rays through the grid shown in Figs. 20 and 21.

In place of the screen 71 provided with stripes or bars 21, 21a and slits 22 which, as already mentioned, cause large losses of light, a screen may be employed which consists of cylindrical lenses 88, (Figs. 20, 21). The individual lenses 88, which can be made of glass, synthetic resin, etc., are fastened at their upper and lower ends, either singly or assembled into small plates of several lenses each, to flexible bands 89 of steel, leather, rubber, etc. They can be flattened in form as is shown in Fig. 23. The side surfaces 90 are roughened and covered with a dark coating to prevent disturbing light reflection. The front and rear sides are so arched that the rays which strike them in parallel beams 26 are so broken that they form narrow bands upon the rear surface. This surface is covered with a luminous or phosphorescent coating which, after it is illuminated by the rays 26, exhibits vertical luminous bands. The position of the luminous bands upon the rear surface depends upon the direction at which the rays 26 strike the lens. As the lenses pass the objective 77 or 77a, the whole field of the luminous coating upon the rear surface is covered with juxtaposed luminous bands.

The weight of the screen is borne by strips 86 of steel, leather, hemp, rubber, etc., which slide upon rails 92 or rollers 93 on the main frame 91. To assist the rollers 52 in carrying along the screen such rollers may be provided with vertical or horizontal grooves or other roughenings or with teeth 94 (Fig. 21) which engage in holes 95 in the screen.

In front of the show rooms and of the objectives 77, 77a, the screen can be conducted either in a straight line or in a concave or convex arc, provided a sharp image is produced upon the luminous coating 72. In place of the objectives 77, 77a, two projectors may be employed, one of which becomes active when the screen moves in the direction of the arrow, and the other when the screen moves in the opposite direction. If the projector is arranged behind the screen, for example at the middle, the mirrors 75, 76 and objectives 77, 77a, may be omitted. In this case, however, it takes some time before the screen has moved so far that the pictures become visible in the show room.

The width of the lenses 23, 88 and the distance of the slits 22 of the projection screen should be so small that the observer in the front row sees no disturbing vertical stripes. This means that the number of lenses or slits in the screen amounts to 500 to 1000 in the smaller theatres and is more than 1000 in the larger threatres. For home projectors the number is of course smaller, for example 200 to 300.

The number of light bands which lie upon the single field behind each slit or behind each cylindrical lens should be so large that a spectator seated in the rearmost seat is able to see two different groups of luminous bands, one with each eye. If, for instance, the distance between two spectators sitting at the extreme left and right seats of the rearmost row, is 50 feet or 600 inches, and assuming the smallest distance between the left and right eye of a spectator to be one inch, the number of luminous bands on each field should be 600. But this number can be reduced to 300, 200, 150 etc., if part of the spectators can see through the slits upon the second or third or fourth etc. band nearest to the band belonging to the slit referred to, which is possible with screens provided with front grids consisting of slits instead of cylindrical lenses. In some cases the luminous bands may overlap each other to some extent, which does not make much difference, as no great difference exists in the views of two adjoining picture bands upon the film strip. The pictures of nearby objects fly so rapidly past the eyes of the spectator that he cannot recognize smaller details anyway.

Figure 26:
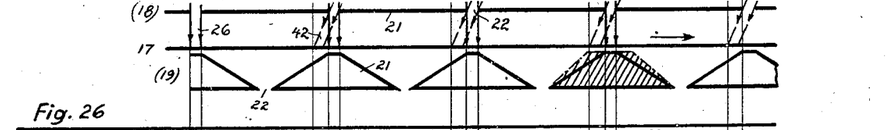
Fig. 26 shows the path of light rays through the grid upon a screen covered with a luminous coating.
Figure 27:
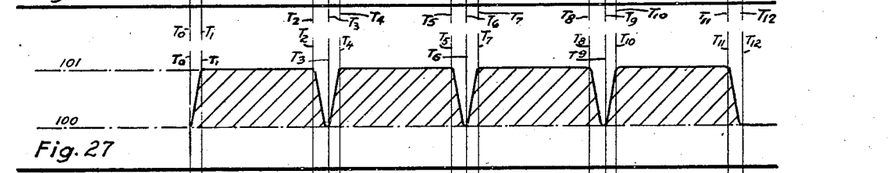
Figs. 27–30 show curves representing the properties of four different types of luminous materials.
Figure 28:
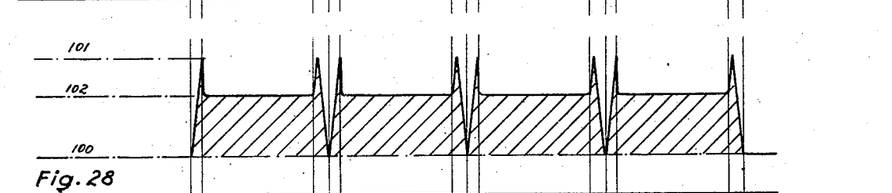

With reference to the luminous or phosphorescent coating to be employed, four different groups will be described whose properties are represented in Figs. 27 to 30. In Fig. 26 are shown the luminous screen 17, the distributor 18, and the grid 19 together with the rays 26 and 42 which excite and extinguish the luminous coating. The exciting rays 26 fall through the slits 22 of the distributor 18 upon the screen 17 which moves with uniform velocity in the direction of the arrow. It is assumed that these rays and the rays 42 are radiated continuously. The rays 26 thus make the coating luminous at those places where they strike the screen. If now the screen moves in the direction of the arrow, the brightness of the coating remains constant until it is struck by the rays 42. As soon as the coating is struck by these rays it loses its brightness, that is, the coating becomes dark again. Immediately thereafter, however, it is impinged by new rays 26 and becomes luminous again and is again later extinguished by new rays 42. This cycle repeats itself continuously in this manner.

The illumination and extinguishment of the coating is indicated in Figs. 27 to 30. The abscissæ indicate the time and the ordinates the intensity, that is, the brightness of the illumination. The fine vertical lines serve for better orientation. During the time T0—T1 for example $\tfrac{1}{10}$ of a second, the brightness of the coating increases from 100 to 101, which is the difference in brightness between the darkest and brightest part of the film pictures. The brightness remains constant from T1 to T2 during $\tfrac{1}{10}$ second. Finally the brightness is reduced from 101 to 100 by the action of the rays 42 in the time T2—T3 of $\tfrac{1}{10}$ second. When the new rays 26 again strike the screen the brightness again increases from 100 to 101 in the time T3—T4, etc.

The luminous compounds of group 2 have the following properties: If the coating (Fig. 28) is struck by the rays 26, its brightness increases from 100 to 101 which however momentarily again falls to 102 as soon as the coating is withdrawn from the action of the rays 26. The brightness of 102 remains constant until the coating is struck by the rays 42. Under the action of the latter its brightness again rises to almost 101, and then falls back to 100, etc. In order to conceal this illumination in the instants T1 and T2 from the spectators, the rods 21 of the screen 19 (Fig. 26) can be given a form such as is indicated by the shaded surface.

The luminous bodies of group III have the following properties: When the body is struck by the rays 26 (Fig. 29) it is excited but does not become luminous. The luminosity appears only when the coating has been warmed, and those places which have been more strongly excited become more brightly illumined. Further, the brightness of the illumination is greater the greater the degree of heating. As the illumination with each luminous coating is never perfectly constant, but fades away more or less rapidly, the control of the heating affords a means of maintaining the brightness of the illumination entirely constant in the time interval from T1 to T2. To this end there are provided heating bodies 96 or 97 behind the individual fields of the luminous screen 17 (Fig. 12). Of these heating bodies group 96 is connected to conductors 98 while the group 97 is connected to conductors 99. If the screen 17 is moved in the direction of the arrow the heating bodies 96 are cut in by a lever 69; while upon reversal of the movement of the screen, the heating bodies 97 are brought into action. The reversal of the lever 69 is accomplished automatically by the photoelectric cells 44 or 45, which control the electromagnets 84 and 85, respectively. The mechanism for accomplishing these results are well known and a detailed description thereof is therefore not necessary.

The heating bodies 96 and 97 are so arranged behind the individual fields of the luminous screen 17 that the distance between the indivdual luminous bands and the respective heating bodies always become smaller, so that the luminous bands are more and more strongly heated and in this way maintained at a constant degree of brightness.

The heating bodies are arranged in individual protecting boxes 68 (Fig. 12) made of metal, porcelain, etc., which however, have gaps 66 between them. These gaps always lie at those places behind the luminous screen 17 where the rays 26 excite the latter to phosphorescence. If now, a stream of cold air is conducted to these gaps by means of any known device, such as a cold air pipe 68a having discharge openings registering with the slits 66, and directed upon the registering illuminated bands on the screen, the latter is cooled and the coating thereon made dark again.

Figure 29:
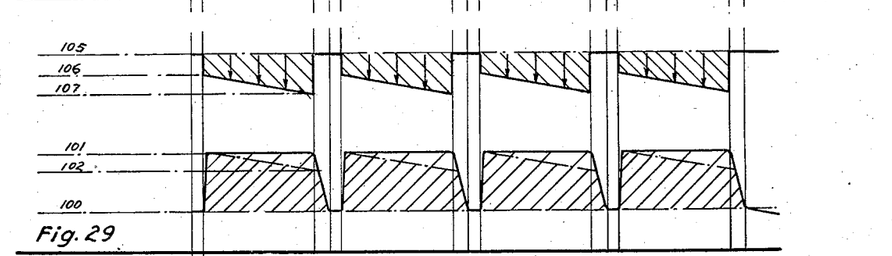

The heat transmission is represented by the curve at the upper part of Fig. 29. If the luminous coating is excited by the rays 26 during the time interval T0—T1, then at the instant T1 it becomes exposed to the action of the heating bodies, and the transfer of heat becomes greater and greater as the coating approaches the heating body. The heat transfer begins at T1, the amount of heat being represented by the size of the arrow from 105 to 106. By the action of this heat the coating becomes luminous so that its brightness increases from 100 to 101. Without further transmission of heat the brightness of the screen would fall from 101 to 102 in the interval T1—T2. During this interval however, the coating moves nearer and nearer to the heating bodies, and thus receives a constantly increasing supply of heat, which is indicated by the increasing size of the arrow from 106 to 107. This heat increase is so controlled that the brightness of the illumination remains constant at 101 during the interval T1—T2.

At the instant T2 the luminous coating reaches a place at which the screen is cooled by a stream of cold air and its brightness is thereby returned again to 100. At T3 the luminous coating is again excited by a new irradiation with the rays 26. At T4 a new absorption of heat occurs from 105 to 106 which again increases the brightness to 101, etc.

Figure 25:
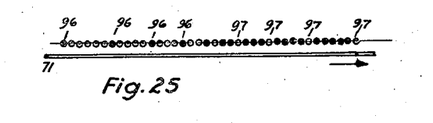
Fig. 25 shows a heating element of different construction.
Figure 30:
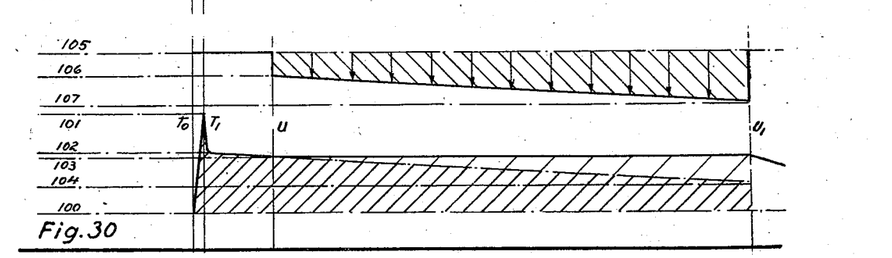

Group IV includes those luminous bodies which are characterized by long enduring luminosity; they may resemble in their properties one of the luminous bodies of Groups I–III, but they must have the capacity of being held at constant brightness by the absorption of heat or other energy. The luminous bodies of Group IV are utilized in arrangements wherein the screen and grid move simultaneously (Fig. 17). If the luminous coating is illumined by the rays 26, it may remain dark as is represented in Fig. 29 or it may become luminous as in Fig. 28. The latter case is represented in Fig. 30. Under the action of the rays 26 the luminous or phosphorescent coating luminesces with the brightness 100—101 which however, in the time T1—U falls from 101 rapidly to 102 and then slowly to 103. By letting the rays 26 pass through a wedge 51 (Fig. 17) the luminous screen may be kept in a state of constant brightness. The wedge, the use of which is well known, has different degrees of transference for light rays, the transference decreasing gradually from the thin end towards the thick end. During the time T1—U the screen 70 (Fig. 17) still moves past the objective 71 or 71a; at the instant U the screen is visible in the showroom 29 until after a period U1, which may amount to 5–10 minutes, it disappears behind the other wall 80. During the time interval U—U1 the brightness of the coating must be maintained constant. This may be accomplished in the above mentioned manner by means of heater 96 or 97 arranged behind the screen 70, in such manner that the heating effect becomes greater and greater the more the screen advances laterally. The heating bodies may be arranged either in two planes whose sides are at different distances from the screen 70 (Fig. 24) or in a plane which is parallel to the screen, and in which the number of heaters 96 uniformly increases and the number of the other heaters uniformly decreases (Fig. 25). If the screen moves in the direction of the arrow the heaters 96 are cut in while in the opposite direction of movement of the screen the heaters 97 become operative. The cutting in of the heaters is carried out in the manner above described by means of the levers 69 controlled automatically by the cells 44, 45.

When the screen moves from U to U1 (Fig. 30) it receives an increasing degree of heat which is presented by the size of the arrows 105—106 to 105—107. This supply of heat maintains the luminosity of the coating constant at the brightness 103 which otherwise would fall during such time interval to 104. As the screen moves past the showroom, which occurs at the instant U1, the supply of heat ceases and the luminous coating again becomes dark.

As the brightness of the luminous coating can, in addition to heat, be influenced also by irradiation with other kinds of light, (infra red, ultra violet) or by the action of electrical or magnetic fields, the heaters 96, 97 can be replaced by luminous vacuum tubes, or by conductors which are charged to a definite tension by direct or alternating current.

As the individual types of luminous bodies luminesce in different colors, a mixture of different luminous bodies can be employed for the projection screen which together give a white light. The properties of the different luminous or phosphorescent bodies are known and are described in the literature on luminous paints. The paint or coating most suitable for any given conditions can be determined by simple experiment.

My invention may be applied also to the production of stationary three-dimensional photographs. To this end instead of covering a screen or plate with a luminous material, a photographic emulsion may be applied. After exposing this light sensitive plate or screen to the influence of the motion picture projections in the manner described above, and developing and fixing the plate or screen as is done with ordinary photographs, a permanent picture is obtained which, when viewed through a suitable grid, will give the impression of three dimensions.

Other variations and modifications of the invention may be resorted to within the scope of the appended claims without departing from the spirit of the invention.

I claim:

1. The method of producing stereoscopic motion pictures, which comprises decomposing the projected images of a succession of pictures on a film into a plurality of bands and directing such bands upon spaced fields on a phosphorescent screen, and progressively moving said screen to cause related bands of successive pictures to be juxtaposed on said screen.

2. The method of producing stereoscopic motion pictures, which comprises decomposing the projected images of a succession of pictures on a film into a plurality of bands and directing such bands upon spaced fields on a phosphorescent screen, progressively moving said screen to cause related bands of successive pictures to be juxtaposed on said screen, and successively extinguishing the correlated luminous bands on the screen to prepare for the reception of newly projected pictures.

3. The method of producing stereoscopic motion pictures, which comprises decomposing the projected images of a succession of pictures on a film into a plurality of bands and directing such bands upon spaced fields on a phosphorescent screen, progressively moving said screen to cause related bands of successive pictures to be juxtaposed on said screen, and then subjecting the correlated luminous bands in succession to the action of infra-red rays to extinguish the same and prepare their fields for the reception of newly projected pictures.

4. The method of producing stereoscopic motion pictures, which comprises decomposing the projected images of a succession of pictures on a film into a plurality of bands and directing such bands upon spaced fields on a phosphorescent screen, progressively moving said screen to cause related bands of successive pictures to be juxtaposed on said screen, and then subjecting the correlated luminous bands on the screen to the action of a cooling agent to extinguish the same and prepare their fields for the reception of newly projected pictures.

5. The method of producing stereoscopic motion pictures, which comprises decomposing the projected images of a succession of pictures on a film into a plurality of bands and directing such bands upon spaced fields on a phosphorescent screen, progressively moving said screen to cause related bands of successive pictures to be juxtaposed on said screen, and periodically reversing the direction of movement of said screen.

6. The method of producing stereoscopic motion pictures, which comprises decomposing the projected images of a succession of pictures on a film into a plurality of bands and directing such bands upon spaced fields on a phosphorescent screen, moving said screen and the source of the projected pictures relatively to each other, exposing spaced luminous fields to an observer in front of the screen, and continuously extinguishing said luminous bands in succession to prepare their fields for the reception of newly projected pictures.

7. Apparatus for the production of stereoscopic motion pictures, comprising a projector, a phosphorescent screen, a distributor between the projector and screen adapted to decompose the projected picture into a plurality of vertical bands which are directed upon the screen, a grid arranged in front of the screen and provided with vertical slits through which the luminous bands upon the screen may be viewed, and means for moving the screen and projector relatively to each other.

8. Apparatus as set forth in claim 7, wherein said projector and distributor are located at the rear of the screen with reference to an observer.

9. Apparatus as set forth in claim 7, wherein the projector, distributor and grid are located in front of the screen with reference to an observer.

10. Apparatus as set forth in claim 7, including means for extinguishing the correlated luminous bands on the screen in succession to prepare their fields for the reception of a newly projected picture.

11. Apparatus as set forth in claim 7, including means for directing infra-red rays upon correlated luminous bands to extinguish the latter to prepare their fields for the reception of a newly projected picture.

12. Apparatus as set forth in claim 7, wherein both the distributor and the grid are positioned in front of the screen with reference to an observer and are composed of intermeshing elements, the elements of the distributor being transparent to infra-red rays and the elements of the grid being opaque thereto, and means for directing infra-red rays against the elements of said distributor.

13. Apparatus for producing stereoscopic motion pictures, comprising a projector, a phosphorescent screen, a distributor between the projector and screen adapted to decompose the picture into a plurality of bands which impinge the screen, a grid in front of the screen through which the latter is viewed, means for moving said screen, and means including a photo-electric cell controlled by the film for reversing the direction of movement of the screen.

14. Apparatus as set forth in claim 13, including two radiating devices for extinguishing the luminous bands upon the screen, and means for throwing one or the other of said devices into operation as the direction of movement of the screen is reversed.

15. In a process for producing stereoscopic effects, the steps which comprise projecting each of a series of pictures, by means of a light beam, upon a light-sensitive screen which is capable of retaining a luminous image after the source of light is cut off, decomposing the beam into a plurality of spaced, relatively narrow bands before it strikes the screen, and moving the screen and source of light laterally relatively to each other and transversely to the direction of projection to cause related bands of successive pictures to be juxtaposed on said screen.

16. A process as set forth in claim 15, wherein the source of light is stationary while the screen is moved continuously.

17. In a process for producing stereoscopic motion pictures, the steps which comprise projecting a succession of pictures of a film by means of a beam of radiant energy, decomposing the beam into a plurality of spaced, relatively narrow bands and directing the related bands of the successive pictures upon separate juxtaposed fields on a phosphorescent screen which is capable of retaining a luminous image after the source of light is cut off and upon which said bands are simultaneously visible.

18. Apparatus for producing stereoscopic effects, comprising a projector, adapted to project a beam of light carrying a picture, a light-sensitive screen capable of retaining a luminous image for a short time after the source of light is cut off, a distributor arranged to decompose a picture projected by said projector into a plurality of spaced, relatively narrow bands which then impinge on said screen, and means for moving said screen and projector laterally relatively to each other, and transversely to the direction of projection, to cause related bands of successive pictures to be juxtaposed and simultaneously visible on said screen.

NEWTON ARFSTEN.